United States Patent
Ueda

(10) Patent No.: US 8,529,344 B2
(45) Date of Patent: Sep. 10, 2013

(54) GAME CONTROL PROGRAM, GAME DEVICE AND GAME CONTROL METHOD, MANAGEMENT SERVER, AND DATA MANAGING METHOD

(75) Inventor: Fumito Ueda, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/559,977

(22) Filed: Jul. 27, 2012

(65) Prior Publication Data

US 2012/0295706 A1    Nov. 22, 2012

Related U.S. Application Data

(63) Continuation of application No. 12/579,606, filed on Oct. 15, 2009, now Pat. No. 8,262,481.

(30) Foreign Application Priority Data

Feb. 2, 2009   (JP) .................................. 2009-021494

(51) Int. Cl.
*A63F 13/00*   (2006.01)

(52) U.S. Cl.
USPC ..................... 463/31; 463/9; 463/33; 463/42

(58) Field of Classification Search
USPC .......................................... 463/9, 31, 33, 42
See application file for complete search history.

(56) References Cited

U.S. PATENT DOCUMENTS

| | | | |
|---|---|---|---|
| 5,558,339 A | 9/1996 | Perlman | |
| 5,680,534 A | 10/1997 | Yamato et al. | |
| 5,793,376 A | 8/1998 | Tanaka et al. | |
| 6,167,358 A | 12/2000 | Othmer et al. | |
| 2006/0128471 A1 | 6/2006 | Willis et al. | |
| 2008/0004118 A1 | 1/2008 | Van Luchene et al. | |
| 2008/0186276 A1 | 8/2008 | Mayer-Ullmann | |

OTHER PUBLICATIONS

United States Office Action dated Oct. 17, 2011, from corresponding U.S. Appl. No. 12/579,606.
United States Office Action dated Jan. 24, 2012, from corresponding U.S. Appl. No. 12/579,606.

*Primary Examiner* — James S McClellan
(74) *Attorney, Agent, or Firm* — Katten Muchin Rosenman LLP

(57) ABSTRACT

A designer terminal according to an embodiment of the present invention is a game device operated by a designer. The designer terminal includes a stage setting unit that generates design data on a virtual space, in which players play games, according to instructions from the designer, a stage distributing unit that distributes the generated design data to an external unit, a game action data acquiring unit that acquires game data recording game actions taken in the virtual space at player terminals that have acquired the design data, and a game action reproducing unit that displays, on the screen of the designer, the game actions taken in the virtual space at the player terminals, based on the acquired game data.

7 Claims, 10 Drawing Sheets

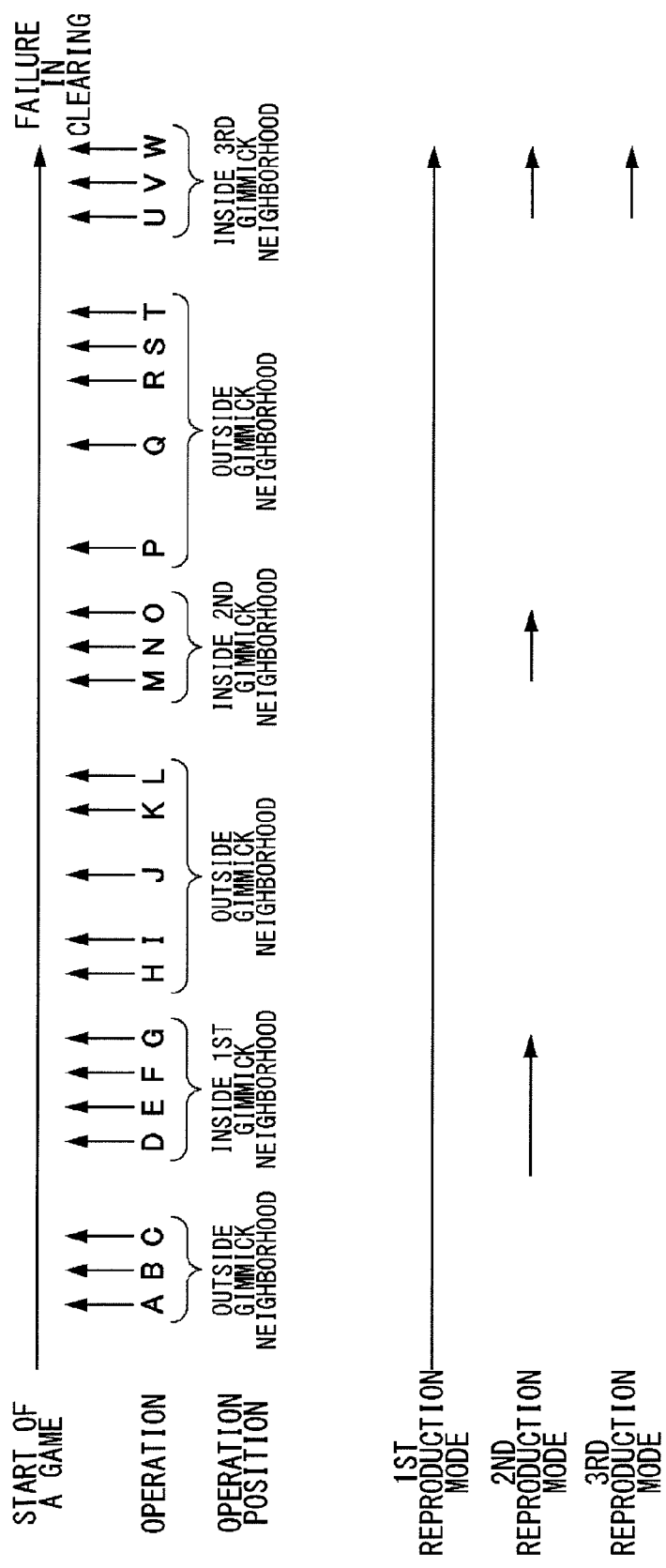

GAME CONTROL PROGRAM, GAME DEVICE AND GAME CONTROL METHOD, MANAGEMENT SERVER, AND DATA MANAGING METHOD

CROSS-REFERENCE TO RELATED APPLICATIONS

This application is a continuation of U.S. Ser. No. 12/579,606, which was filed on Oct. 15, 2009, which is pending and which claims Foreign Priority to Japan Serial No. 2009-021494, which was filed on Feb. 2, 2009 and which is hereby incorporated by reference in its entirety for all purposes.

BACKGROUND OF THE INVENTION

1. Field of the Invention

The present invention relates to a data processing technology and, in particular, to a technology for controlling a game and a technology for managing game data.

2. Description of the Related Art

There are certain games characteristic in that users themselves generate contents to be incorporated as parts into a game and distribute the contents to the other users so that they can play the game having incorporated such contents. A game of this type will hereinafter be referred to as a "UGC (User Generated Content) game" also.

RELATED ART LIST (1) U.S. Pat. No. 5,793,376.

SUMMARY OF THE INVENTION

In UGC games, it is important that a variety of contents be supplied by the users generating contents (hereinafter also referred to as "content generating users" as appropriate). To that end, the inventor has conceived the need to realize a game element that enhances the enjoyment of the content generating users.

The present invention has been made based on the above-mentioned conception of the inventor, and a main purpose thereof is to provide a game control technology that enhances the enjoyment of content generating users in UGC games.

In order to resolve the aforementioned problems, a game control program, embedded in a computer readable medium, according to one embodiment of the present invention comprises: a design module operative to generate design data on a virtual space, in which players play a game, according to an instruction from a designer; a distribution module operative to distribute the generated design data to an external unit; an acquisition module operative to acquire, from an external unit, game data recording game actions taken in the virtual space at player terminals that have acquired the design data; and a display control module operative to display, on a screen of the designer, the game actions taken in the virtual space at the player terminals, based on the acquired game data.

Another embodiment of the present invention relates to a game device. This device comprises: a design data generating unit which generates design data on a virtual space, in which players play a game, according to an instruction from a designer; a distribution unit which distributes the generated design data to external units; an acquisition unit which acquires, from the external units, game data recording game actions taken in the virtual space at player terminals that have acquired the design data; and a display control unit which displays, on a screen of the designer, the game actions taken in the virtual space at the player terminals, based on the acquired game data.

Still another embodiment of the present invention relates to a method for controlling a game. This method comprises: generating design data on a virtual space, in which players play the game, according to an instruction from a designer; distributing the generated design data to external units; acquiring, from the external units, game data recording game actions taken in the virtual space at player terminals that have acquired the design data; and displaying, on a screen of the designer, the game actions taken in the virtual space at the player terminals, based on the acquired game data.

Still another embodiment of the present invention relates to a management server. This management server comprises: a design data acquiring unit which acquires design data on a virtual space, in which players play a game, from a designer terminal; a design data distributing unit which distributes the acquired design data to player terminals; a game data acquiring unit which acquires game data recording game actions taken in the virtual space, from the player terminals; and a game data distributing unit which distributes the acquired game data to the designer terminal to display the game actions taken in the virtual space at the player terminals on a screen of the designer.

Still another embodiment of the present invention relates to a method for managing data. This method comprises: acquiring design data on a virtual space, in which players play a game, from a designer terminal; distributing the acquired design data to player terminals; acquiring game data recording game actions taken in the virtual space, from the player terminals; and distributing the acquired game data to the designer terminal to display the game actions taken in the virtual space at the player terminals on a screen of the designer.

Optional combinations of the aforementioned constituting elements, and implementations of the invention in the form of methods, apparatuses, systems and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 6 is a schematic representation showing three modes of reproduction of game actions;

DETAILED DESCRIPTION OF THE INVENTION

The invention will now be described by reference to the preferred embodiments. This does not intend to limit the scope of the present invention, but to exemplify the invention.

An outline of embodiments of the present invention will be given before a description of the structure thereof.

In the development of games, it is generally professional developers of game programs that develop contents to be incorporated into the games as parts thereof. Such contents are, for instance, levels or stages as constituent units of a game (hereinafter also referred to as "game stages"). Prior to launching a game on the market, the game developer may use monitor players who play the game stages once generated and may brush them up based on the actual game actions taken by the monitor players.

A UGC game is characteristic in that the game stages are supplied by users generating the game stages (hereinafter also referred to as "designers" as appropriate). And the users who play the UGC game (hereinafter also referred to as "players" as appropriate) play the game stages supplied by the designers. UGC games of the past, however, did not have the scheme in which game actions of the players are fed back to the designers. Even when opinions were exchanged between the designers and the players via electronic mail, electronic bulletin board or the like, it is often the case that game actions are not accurately fed back to the designers.

With a technology proposed in the present embodiments, actual game actions of players for a game stage are fed back to the designer who has developed the game stage. Thus, in a UGC game, the designer can check the actual game actions of the players and can thereby get enhanced enjoyment from the game. For example, the designer can brush up a game stage he/she has once supplied, based on the game actions of the players. Also, as a result of the enhanced enjoyment of the designer, it can be expected that a greater variety of game stages are supplied by a greater number of designers. With a greater variety of game stages supplied, the enjoyment of the players will increase and the UGC game as a whole can give a greater satisfaction to the users.

Figure 1:
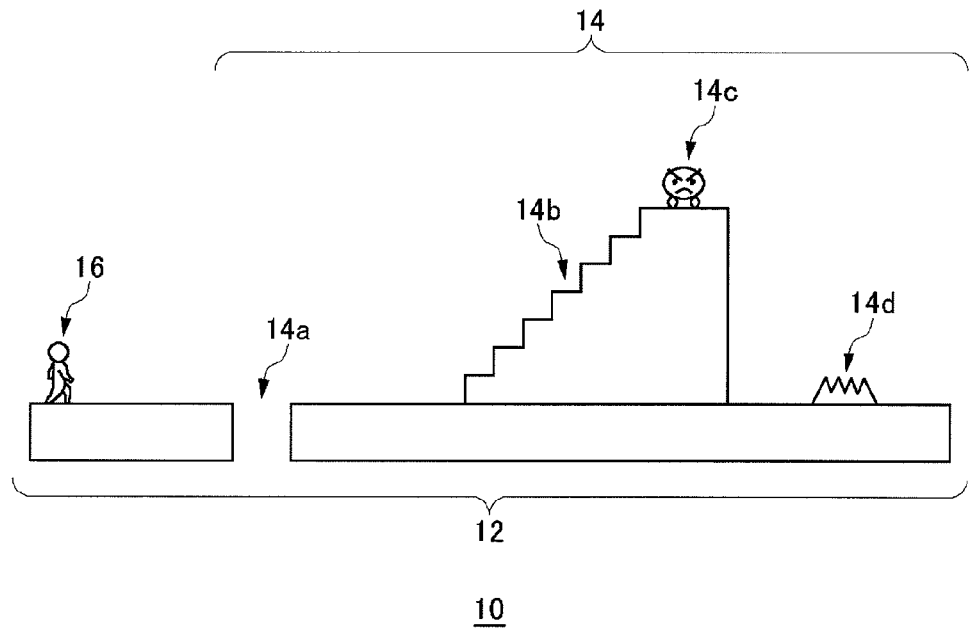
FIG. 1 is a schematic illustration of a game stage which is generated by a designer.

FIG. 1 is a schematic illustration of a game stage which is generated by a designer. In a virtual space 12 presented in a game stage 10, a starting point and a finishing point are set in their respective predetermined positions. The game stage 10 is cleared when a character (hereinafter also referred to as "player's character") 16 to be played by a player moves from the starting point to the finishing point. In the game stage 10 of FIG. 1, the game stage may be cleared when the player's character 16 has succeeded in reaching the right edge of the stage illustrated in FIG. 1.

The designer places virtual objects (hereinafter also referred to as "gimmicks") 14, which serve as obstacles to the move or travel of the player's character 16, in arbitrary positions in the virtual space 12. In the game stage 10 of FIG. 1, a cliff 14a, steps 14b, an enemy character 14c, and thorns 14d are placed as gimmicks 14. Failure to clear the game stage occurs when the player's character 16 falls off the cliff 14a or comes in direct contact with the enemy character 14c or the thorns 14d. Thus, in playing the game stage 10, the player tries to move the player's character 16 ahead until it reaches a predetermined finishing point, by dodging those gimmicks.

(First Embodiment)

Figure 2:
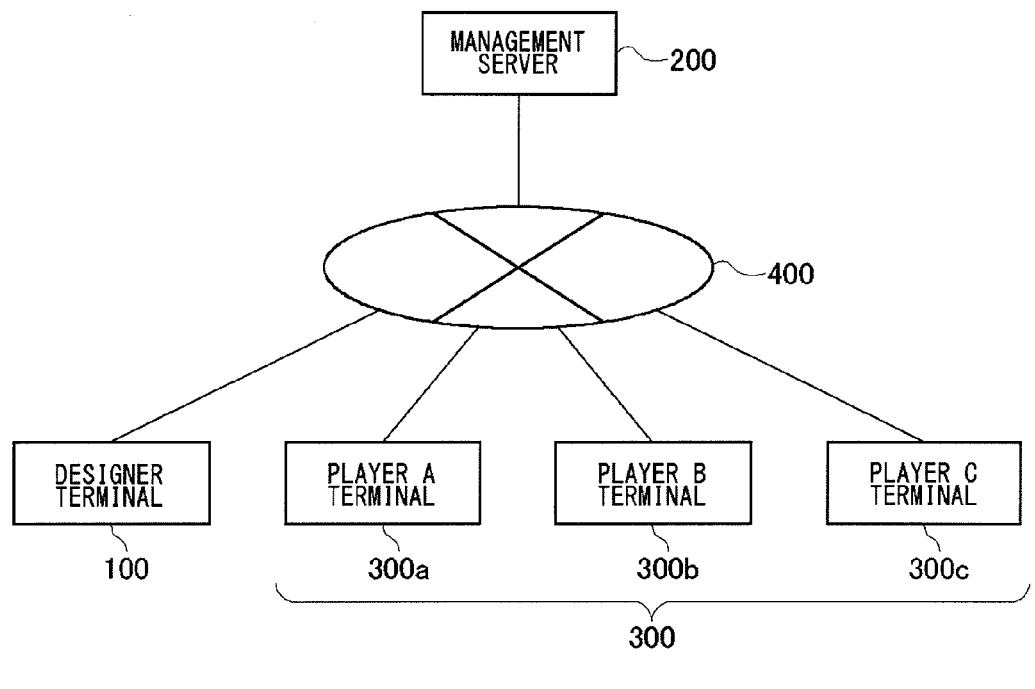
FIG. 2 shows a structure of a game system according to a first embodiment of the present invention.

FIG. 2 shows a structure of a game system according to a first embodiment of the present invention. A game system 1000 includes a designer terminal 100, a management server 200, and a player A terminal 300a, a player B terminal 300b and a player C terminal 300c, which are generically referred to as "player terminals 300" or "player terminal 300". The management server 200 and the designer terminal 100, as well as the management server 200 and the player terminals 300, are connected to each other via a communication network 400, which includes without limitation publicly known technologies such as LAN, WAN and the Internet.

The designer terminal 100 is a game device to be operated by a designer, whereas the player terminals 300 are game devices to be operated by players. The designer terminal 100 and the player terminals 300 may be either stationary game devices or portable game devices, respectively. In the case where they are portable game devices, they may be connected to the communication network 400 via access points of wireless LANs.

The designer terminal 100 provides a designer with an environment in which he/she designs a game stage 10. The designer terminal 100 receives operation inputs from the designer and generates corresponding design data, including placement information on gimmicks 14, concerning the game stage 10 including a virtual space 12 where the gimmicks 14 selected by the designer are placed. The detailed structure of the designer terminal 100 will be discussed later.

The player terminals 300 provide players with an environment in which they play the game stage 10 designed by the designer. The player terminals 300 receive operation inputs from the players and generate corresponding game action data, including operation information on the player's character 16 in the game stage 10. The detailed structure of the player terminal 300 will be discussed later.

It is to be noted that the same user can become a designer when he/she generates a game stage 10 and a player when he/she plays a game stage 10. According to the present embodiment, therefore, the functional structure of the designer terminal 100 and that of the player terminal 300 are the same as will be explained later. Yet, for simplicity and convenience of explanation, distinction will be made between the designer terminal 100 and the player terminal 300. Hereinbelow, the designers and the players will be called simply the "users" when they are referred to collectively.

The management server 200 relays data sent and received between the designer terminal 100 and the player terminals 300. Specifically, the management server 200 acquires design data on a game stage 10 generated at the designer terminal 100 and distributes it to the player terminals 300 so that the players can play the game stage 10. Also, the management server 200 acquires game action data on game stages 10 generated at the player terminals 300 and delivers it to the designer terminal 100 so that the designer can check the game actions taken by the players. The detailed structure of the management server 200 will be discussed later.

In this game system 1000, each user possesses virtual currency (hereinafter also referred to as "points") that has its worth in the game. The user can purchase points in the game and can further purchase game items such as weapons with which to arm the player's character 16, with the points in possession. The game stage 10 has points to be paid to the player as the prize for clearing the stage, which is set according to the level of difficulty. The details of point variation will be discussed later.

Figure 3:
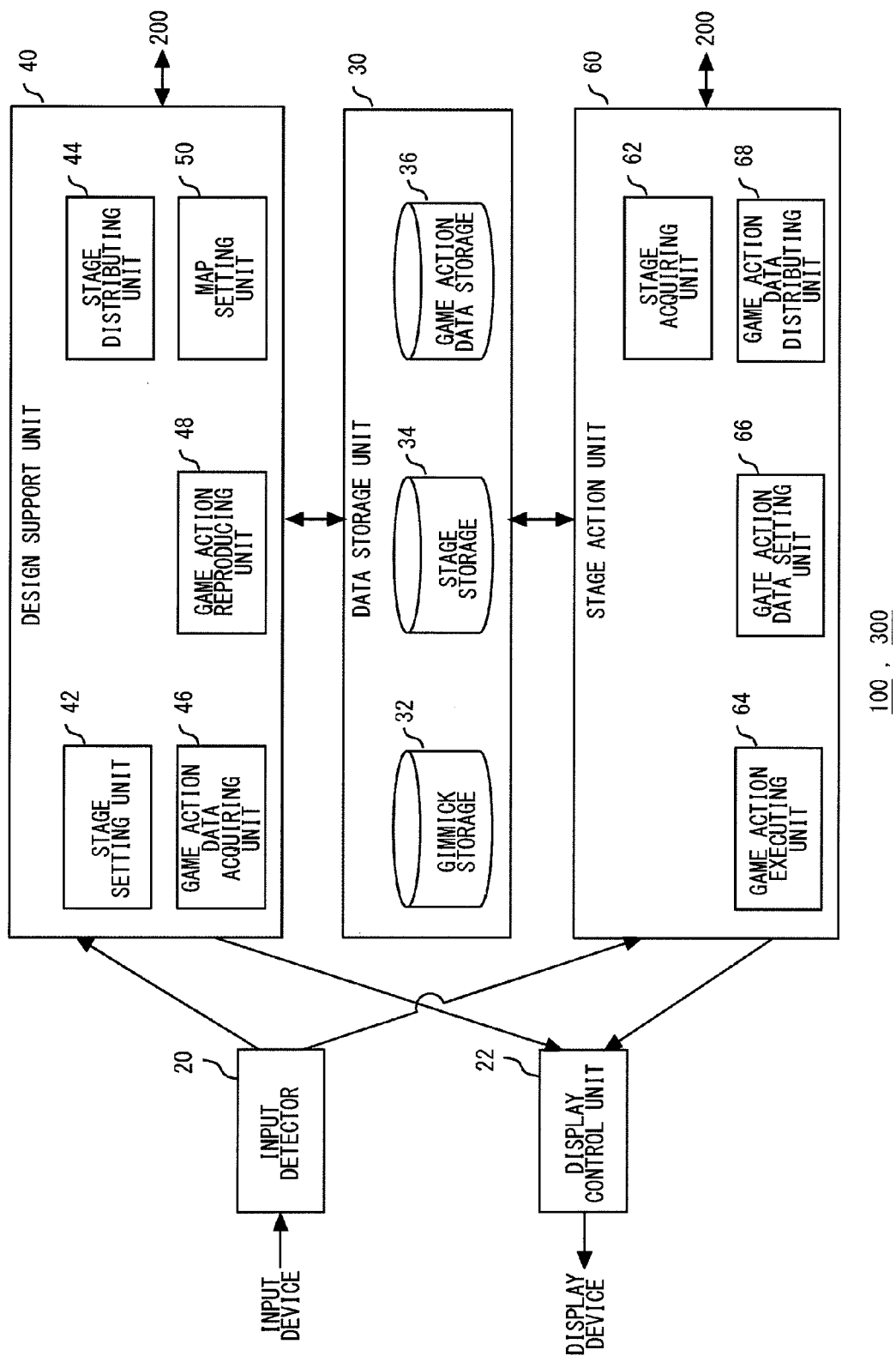
FIG. 3 is a block diagram showing a functional structure of a designer terminal and player terminals of FIG. 2.

FIG. 3 is a block diagram showing a functional structure of the designer terminal 100 and player terminals 300 of FIG. 2. The designer terminal 100 and the player terminals 300 each includes an input detector 20, a display control unit 22, a data storage unit 30, a design support unit 40, and a stage action unit 60.

Each block shown in the block diagrams of the present patent specification may be achieved hardwarewise by elements and mechanical devices such as a CPU and the like of a computer, and softwarewise by computer programs embedded in a computer readable medium or the like. Depicted herein are functional blocks implemented by cooperation of hardware and software. Therefore, it will be obvious to those skilled in the art that the functional blocks may be implemented by a variety of manners including hardware only, software only or a combination of both.

The input detector 20 detects operations of a user on an input device, such as a controller or a keyboard, and sends out data showing the operation inputs (hereinafter also referred to as "operation data") to each functional block. Typically, the input detector 20 sends out operation data to the design support unit 40 when a game stage 10 is designed and operation data to the stage action unit 60 when the game stage 10 is played. The display control unit 22 receives, from each functional block, data to be displayed on a display device and has the data displayed on the display device.

The data storage unit 30 provides storage area where various data necessary for information processing at the designer terminal 100 and the player terminals 300 are stored. The data storage unit 30 includes a gimmick storage 32, a stage storage 34, and a game action data storage 36.

The gimmick storage 32 stores attribute information concerning a plurality of gimmicks 14 that can be placed in the virtual space 12. Specifically, the gimmick storage 32 stores the IDs of the respective gimmicks 14 in association with the setting data including processing contents and drawing data to be used when the gimmicks 14 are placed in the virtual space 12 (hereinafter also referred to as "gimmick data") and the points required to place the gimmicks 14 (hereinafter also referred to as "gimmick points"). In the gimmick storage 32, the gimmicks 14 which are assumed to present higher levels of difficulty are associated with higher gimmick points. For example, if the level of difficulty rises in the order of the steps 14b, the cliff 14a, the thorns 14d, and the enemy character 14c, which are shown in FIG. 1, 5 points, 10 points, 20 points and 30 points, in this order, may be set for them as gimmick points.

Figure 4:
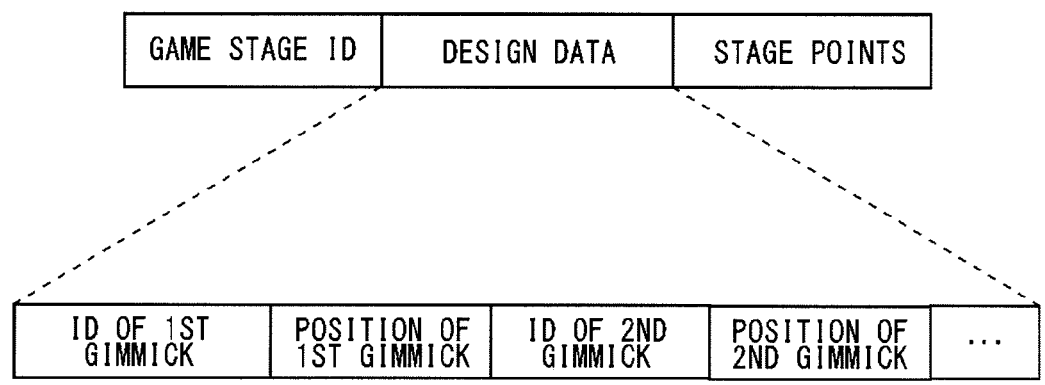
FIG. 4 shows a structure of data stored in a stage storage of FIG. 3.

The stage storage 34 stores the ID of the game stage 10 in association with the design data and the total of gimmick points for the respective gimmicks 14 placed in the game stage 10 (hereinafter also referred to as "stage points"). FIG. 4 shows a structure of data stored in the stage storage 34 of FIG. 3. Recorded in the design data as shown in FIG. 4 are the IDs of the respective gimmicks 14 placed in the game stage 10 in association with the placement positions of the gimmicks (hereinafter also referred to as "gimmick positions"). If the virtual space 12 is set as a two-dimensional or three-dimensional coordinate space, the gimmick positions may be two-dimensional or three-dimensional coordinate data which make their positions in the virtual space 12 uniquely identifiable. Now refer back to FIG. 3.

Figure 5:
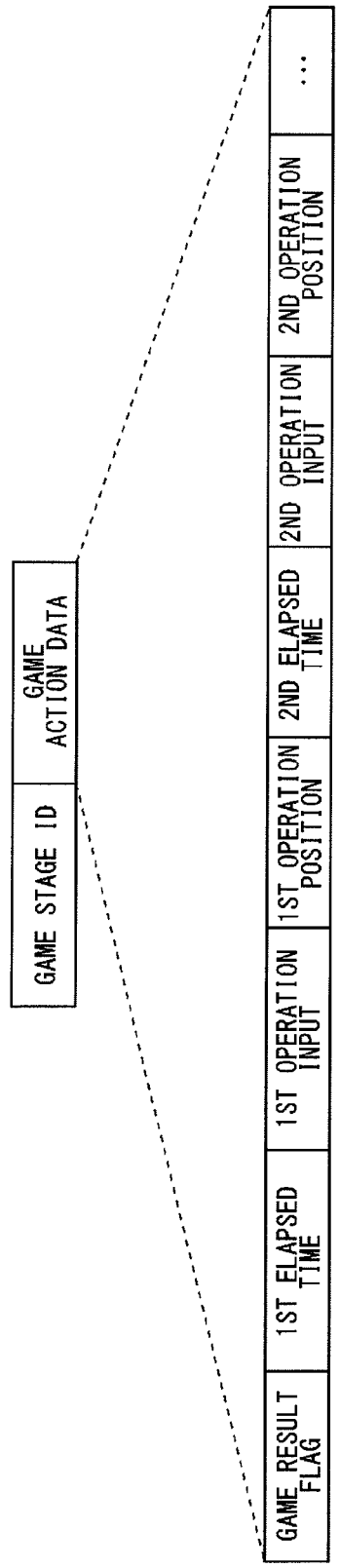
FIG. 5 shows a structure of data stored in a game action data storage of FIG. 3.

The game action data storage 36 stores the ID of the game stage 10 in association with game action data showing the game actions taken by the players in the game stage 10. FIG. 5 shows a structure of data stored in the game action data storage 36 of FIG. 3. Recorded in the game action data is the elapsed time after previous operation when an operation by a player is received at a game action executing unit 64 to be described later, in association with data showing the operation input and the position of the player's character 16 in the virtual space 12. Note that the elapsed time recorded for the initial operation after the start of a game is the elapsed time from the point when the game is started. The data showing the operation input may be, for instance, the ID of the button on an input device, such as a controller, operated by the player. The game action data further include a flag indicating a success or failure in clearing the game stage 10 (hereinafter also referred to as a "game result flag"). Now refer back to FIG. 3.

The stage action unit 60 executes various processings that enable the player to play the game stage 10. The stage action unit 60 includes a stage acquiring unit 62, a game action executing unit 64, a game action data setting unit 66, and a game action data distributing unit 68. The stage acquiring unit 62 acquires design data on a game stage 10 specified by a player from the management server 200 and records the ID of the game stage 10, in association with the design data thereon, in the stage storage 34.

The game action executing unit 64 executes game action processings for the game stage 10 specified by the player. Specifically, the game action executing unit 64 first acquires design data on the game stage 10 specified by the player from the stage storage 34. Then the game action executing unit 64 acquires gimmick data from the gimmick storage 32, using the gimmick ID recorded in the design data as a key. Then the game action executing unit 64 sets the gimmick data in predetermined initial data for the virtual space 12 so that a gimmick 14 may be placed in a specific position of the virtual space 12 as indicated by the gimmick position in the design data. Where a plurality of gimmicks 14 are recorded in the design data, the same processing is carried out for each of the gimmicks 14.

The game action executing unit 64 further sets data on the player's character 16 in the data on the virtual space 12 so that the player's character 16 may be placed at the starting point of the virtual space 12. The game action executing unit 64 has an initial screen of the virtual space 12 displayed on a display device by sending out the data on the virtual space 12, in which the gimmick 14 and the player's character 16 are already set, to the display control unit 22.

When an operation input from the player playing the game stage 10 is received by the input detector 20, the game action executing unit 64 moves the player's character 16 in the virtual space 12 according to the operation input. The game action executing unit 64 determines whether the player's character 16 has dodged the gimmick 14 successfully or not, by checking the position of the player's character 16. And if it determines a failure to do so, conveys a failure in clearing the game stage 10 to the player. At the same time, the game action executing unit 64 conveys a success or failure in clearing the game stage 10 to the game action data setting unit 66.

When an operation input from the player playing the game stage 10 is received by the input detector 20, the game action data setting unit 66 identifies the elapsed time after previous operation, the operation input and the position of the player's character 16 in the virtual space 12. It is to be noted that the above-mentioned data to be identified may be received one by one from the game action executing unit 64. Then the above-mentioned data are recorded one by one in the game action data, associated with the ID of the game stage 10 now being played, which are stored in the game action data storage 36. When a success or failure in clearing the game stage 10 is conveyed from the game action executing unit 64, the game action data setting unit 66 sets data indicating the success or failure for the game result flag of the game action data.

The game action data distributing unit 68 monitors the record in the game action data storage 36 and identifies the record for which the game result flag of the game action data is set. The game action data distributing unit 68 transmits the game action data for which the game result flag is set and transmits the game stage ID associated with the game action data to the management server 200.

The design support unit 40 provides a support function for a designer designing a game stage 10. The design support unit 40 includes a stage setting unit 42, a stage distributing unit 44, a game action data acquiring unit 46, a game action reproducing unit 48, and a map setting unit 50.

The stage setting unit 42 receives specifications of a gimmick 14 to be placed in the virtual space 12 and the gimmick position therein from the designer via the input detector 20. The stage setting unit 42 generates design data on the game stage 10 by associating the ID of the specified gimmick 14 with the gimmick position. Also, the stage setting unit 42 identifies stage points by acquiring the gimmick points of the specified gimmick 14 from the gimmick storage 32. Where a plurality of gimmicks 14 are specified, the stage setting unit 42 generates design data covering all the gimmicks 14 and calculates the stage points by totaling the gimmick points of the gimmicks 14.

The stage setting unit 42, when it receives an instruction for the storage of a game stage 10 from the designer via the input detector 20, issues a new ID for the game stage 10. Then the stage setting unit 42 records the ID of the game stage 10, in association with the design data and stage points, in the stage storage 34.

The stage distributing unit 44 receives an instruction for the disclosure of a specific game stage 10 from the designer via the input detector 20. Then the stage distribution unit 44 acquires the ID of the game stage 10, the design data and the stage points from the stage storage 34, and transmits them to the management server 200.

The game action data acquiring unit 46 acquires game action data from the management server 200, using the ID of the game stage 10 specified by the designer as a key. Then the game action data acquiring unit 46 records the ID of the game stage 10, in association with the game action data, in the game action data storage 36.

The game action reproducing unit 48 acquires game action data from the game action data storage 36, using the ID of the game stage 10 specified by the designer as a key. Then the game action reproducing unit 48 controls the game action executing unit 64 according to the game action data acquired from the game action data storage 36, in order to display reproduction images of the game actions taken by the player in the game stage 10 on the display device. Hereinbelow, three modes of reproduction of game actions in the game stage 10 are explained.

In a first reproduction mode, game actions by a player are reproduced just as they are. Specifically, whenever a passage of elapsed time recorded in game action data is detected, the game action reproducing unit 48 conveys the operation inputs associated with the elapsed time in the game action data to the game action executing unit 64. The game action executing unit 64, which handles the operation inputs conveyed from the game action reproducing unit 48 the same way as the operation inputs from the player received by the input detector 20, moves the player's character 16. In this manner, the game actions of the player are reproduced sequentially just as they are.

In a second reproduction mode, the reproduction is limited to the game actions of a player in the neighboring region of a gimmick position. Specifically, the game action reproducing unit 48 identifies a gimmick position recorded in design data on a game stage 10 specified by the designer by referencing the stage storage 34. Then, out of the operation positions recorded in game action data, the game action reproducing unit 48 identifies the operation positions whose difference from the identified gimmick position is within a predetermined range, as the operation positions to be reproduced. This range may be determined in consideration of the content of the reproduction image display or the time balance, or its values may be determined as appropriate based on the knowledge gained through business operation or experiments or the like using the game system 1000. The game action reproducing unit 48 extracts, from game action data, the operation positions to be reproduced and the elapsed times and operation inputs associated therewith in the game action data, as reproduction data.

Whenever a passage of elapsed time recorded in the reproduction data is detected, the game action reproducing unit 48 conveys the operation input and operation position to be reproduced, which are associated with the elapsed time in the reproduction data, to the game action executing unit 64. The game action executing unit 64 places the player's character 16 at the operation position to be reproduced and at the same time moves the player's character 16 according to the operation input. In this manner, the game actions of a player in the neighboring region of a gimmick position are reproduced.

In a third reproduction mode, the reproduction is limited to the game actions of a player in the neighboring region of a gimmick position, in which the movement of the player's character 16 has been obstructed by the gimmick 14. In other words, of the game actions of a player in the neighboring region of a gimmick position, only the game actions which have ended in a failure in clearing the game stage 10 due to the gimmick 14 are reproduced.

Specifically, the game action reproducing unit 48 first determines whether the game result flag of game action data is set for a failure in clearing or not. The game action reproducing unit 48 excludes game action data having the game result flag set for a success in clearing from the objects of reproduction. Then, the game action reproducing unit 48 identifies the gimmick position recorded in design data on the game stage 10 specified by the designer by referencing the stage storage 34. Then, out of the operation positions recorded in the game action data, the game action reproducing unit 48 further identifies the operation position whose difference from the identified gimmick position is within a predetermined range and which is also recorded in the last portion of the time series, as the operation position to be reproduced. Where a plurality of operations are recorded in the neighborhood of a gimmick 14 having caused a failure in clearing, the game action reproducing unit 48 identifies the operation positions corresponding to the plurality of operations as the operation positions to be reproduced. The game action reproducing unit 48 extracts, from the game action data, the operation positions to be reproduced and the elapsed times and operation inputs, associated with the operation positions to be reproduced in the game action data, as reproduction data. From here on, the game action reproducing unit 48 and the game action executing unit 64 operate the same way as in the second reproduction mode, so that the game actions, in which the movement of the player's character 16 has been obstructed by the gimmick 14, are reproduced.

FIG. 6 is a schematic representation showing three modes of reproduction of game actions. The representation of FIG. 6, which shows a time series of operations executed by a player from a start of playing to a failure in clearing a game stage 10, has operations A through W associated with the operation position inside or outside the neighborhood of the applicable gimmicks. In the first reproduction mode, all the game actions from the start of playing to the failure in clearing are reproduced. In the second reproduction mode, the game actions in the neighborhood of the gimmicks are reproduced. In the third reproduction mode, the game actions in the neighborhood of the gimmick 14 that directly caused a failure in clearing the game stage are reproduced. Now refer back to FIG. 3.

Where the ID of a game stage 10 specified by a designer is associated with a plurality of game action data in the game action data storage 36, the arrangement may be such that the game action reproducing unit 48 has the reproduction images based on the plurality of game action data displayed sequentially on the display device. Also, it may be so arranged that the designer is asked to select one of the plurality of game action data for a display of the reproduction images and the reproduction images of the selected game action data are displayed.

The map setting unit 50 sets data on a map where gimmicks 14 placed in a game stage 10 specified by a designer and game actions by a player's character 16 are drawn. And they are displayed on the display device via the display control unit 22. Drawn in this map are typically a starting point and a finishing point in a virtual space 12, gimmicks 14 placed therein, and a movement (travel) path of a player's character 16.

A description of how map data on a game stage 10 are set is given below. In a similar manner to the already-described processing by the game action executing unit 64, the map setting unit 50 sets data on the virtual space 12 where gimmicks 14 are placed, according to the design data and gimmick data on the game stage 10 specified by the designer. Next, the map setting unit 50 acquires game action data associated with the game stage 10 from the game action data storage 36, identifies a movement path of the player's character 16 according to the operation inputs recorded in the game action data, and sets the data indicating the movement path in the data on the virtual space 12. Note that with the game action data recording a failure in clearing the game stage 10, the movement path drawn goes only halfway in the virtual space 12. Next, the map setting unit 50 generates a set of map data representing a predetermined type of map, such as shown in FIGS. 7A and 7B, from the data on the virtual space 12 in which the gimmicks 14 and the movement path of the player's character 16 are already set.

Figure 7A:
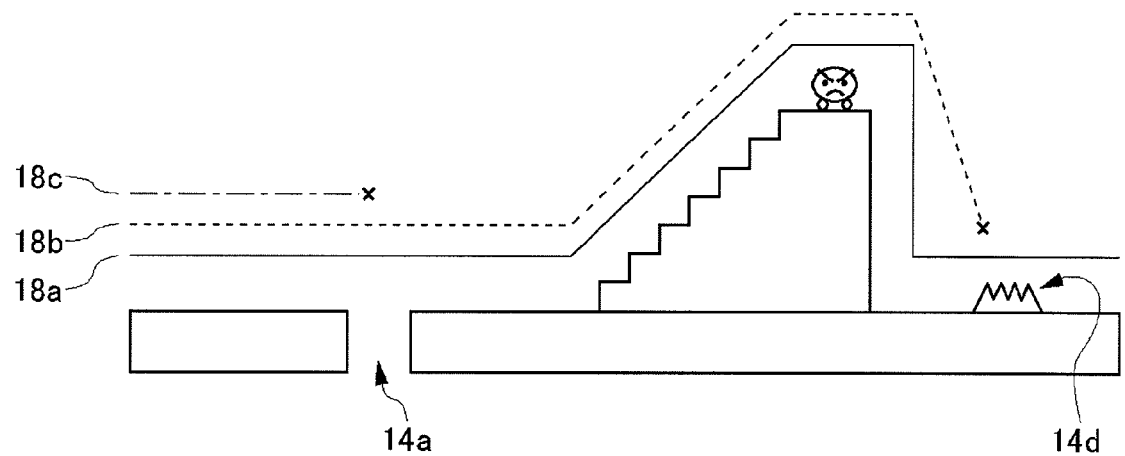
FIGS. 7A and 7B are schematic illustrations of maps to be checked by a designer.
Figure 7B:
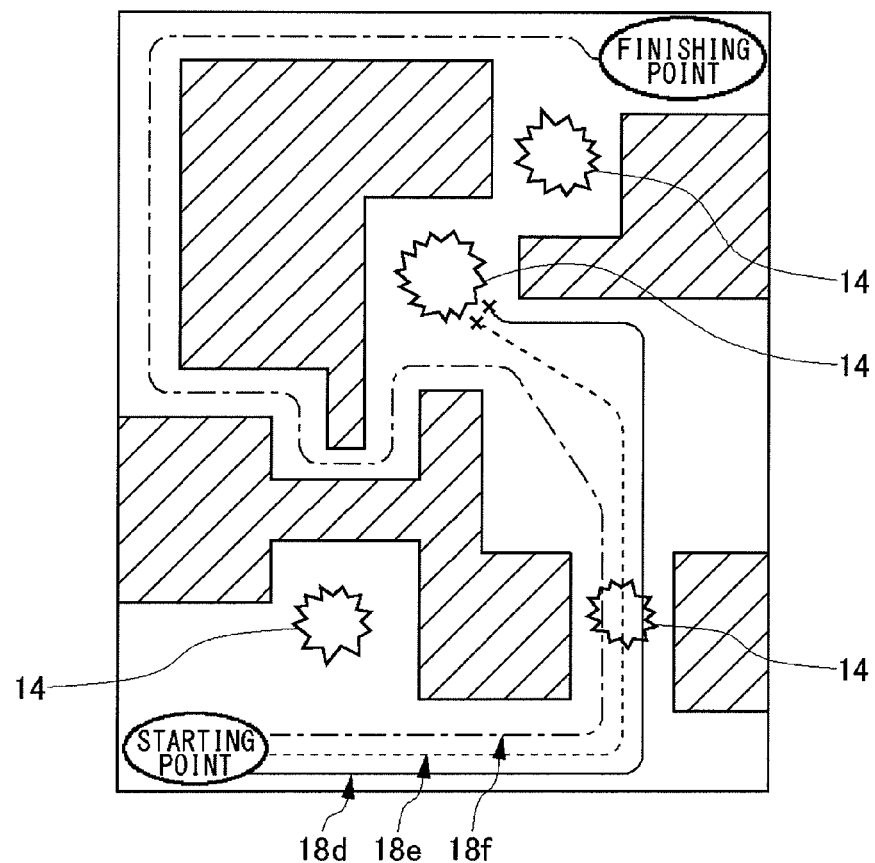

FIGS. 7A and 7B are schematic illustrations of maps to be checked by the designer. FIG. 7A shows that a first movement path 18*a*, a second movement path 18*b* and a third movement path 18*c* are drawn on a map of the virtual space 12 shown in FIG. 1. The respective movement paths are drawn based on game action data where game actions for different timings or different players are recorded. The first movement path 18*a* indicates that clearing the game stage 10 is successful. The second movement path 18*b* indicates that clearing the game stage 10 fails in the position of thorns 14*d*. The third movement path 18*c* indicates that clearing the game stage 10 fails in the position of cliff 14*a*.

FIG. 7B, which is a map in a different mode, is a bird's eye view showing the placement of the gimmicks 14 in the virtual space 12 and the movement paths of player's character 16. For example, this is a mode suitable for a game such as a 3D dungeon search game. The fourth movement path 18*d* and the fifth movement path 18*e* each indicates that clearing the game stage 10 fails due to gimmicks 14 within the virtual space 12. The sixth movement path 18*f* indicates that clearing the game stage 10 is successful by progressing along a movement path different from the fourth movement path 18*d* and the fifth movement path 18*e*. Now refer back to FIG. 3.

As it is detected by the input detector 20 that a specific movement path is selected by the designer from among the movement paths shown on the map, the game action reproducing unit 48 displays the reproduction image of a game action associated with the selected movement path on the display device. Specifically, the game action reproducing unit 48 acquires game action data, from which the movement paths are generated, from the game action data storage 36. Then the game action reproducing unit 48 extracts data for reproduction from the acquired game action data and displays the reproduction images of a game action associated with the selected movement path on the display device. The reproduction images of game actions may be displayed in such a manner that the game actions are limited to those played after a position is selected by the designer. In such a case, the game action reproducing unit 48 identifies an operation input associated with the selected position of a movement path, from the game action data and extracts the reproduction data from the game action data which are to be used after said operation input.

Figure 8:
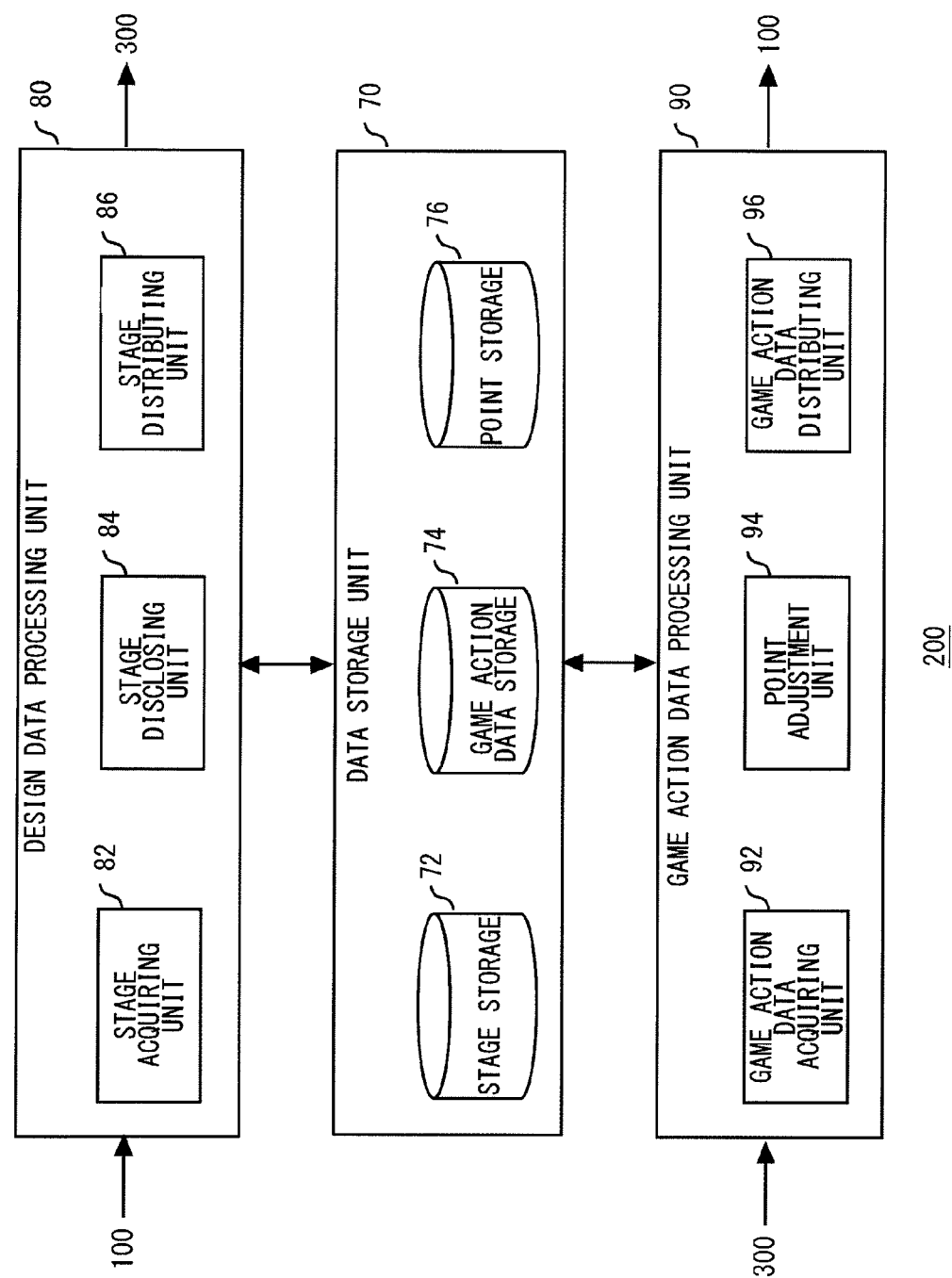
FIG. 8 is a block diagram showing functional components of a management server of FIG. 2.

FIG. 8 is a block diagram showing functional components of the management server 200 of FIG. 2. The management server 200 includes a data storage unit 70, a design data processing unit 80, and a game action data processing unit 90. The storage unit 70 provides storage area where various data necessary for information processing at the management server 200 are stored. The data storage unit 70 includes a stage storage 72, a game action data storage 74, and a point storage 76.

The stage storage 72 is structured the same way as already described and shown in FIG. 4; the ID of the game stage 10 is stored therein in association with the design data and the stage point. The game action data storage 74 is structured the same way as already described and shown in FIG. 5; the ID of the game stage 10 is stored therein in association with the game action data. The points possessed by each of a plurality of users are stored in the point storage 76 in association with each user's ID.

The design data processing unit 80 distributes the design data of the game stage 10 uploaded from the designer terminal 100, to the player terminals 300. The designer data processing unit 80 includes a stage acquiring unit 82, a stage disclosing unit 84, and a stage distributing unit 86. The stage acquiring unit 82 receives the ID of the game stage 10, the design data and the stage points sent from the stage distributing unit 44, and records them in the stage storage 72.

The stage disclosing unit 84 discloses various pieces of information on the game stages 10 stored in the stage storage 72 to the player terminals 300. For example, the stage disclosing unit 84 may release a web page that displays a list of the IDs of game stages 10 uploaded to the management server 200 and the stage points associated with the IDs thereof, on the Internet. The stage distributing unit 86 receives a request for the acquisition of a specific game stage 10 from the stage acquiring unit 62 of a player terminal 300. Then the stage distributing unit 86 acquires the ID of the game stage 10 and the design data from the stage storage 72 and sends them to the player terminal 300.

The game action data processing unit 90 delivers the game action data on the game stage 10 uploaded from the player terminal 300 to the designer terminal 100. The game action data processing unit 90 includes a game action data acquiring unit 92, a point adjustment unit 94, and a game action data distributing unit 96.

The game action data acquiring unit 92 receives the ID of the game stage 10 and the game action data sent from the game action data distributing unit 68 of the player terminal 300, and records them in the game action data storage 74. The game action data distributing unit 96 receives, from the game action data acquiring unit 46 of the designer terminal 100, a request for the acquisition of game action data where the specific game stage 10 has been identified. Then the game action data distribution unit 96 acquires the game action data identified by the ID of said game stage from the game action data storage 74, and sends the thus acquired data to the designer terminal 100.

The point adjustment unit 94 adjusts the points possessed by the designer and the players according to a game result of the game stage 10 played by the players. Specifically, whether a player succeeds in clearing the game stage 10 or not is identified by referencing a game result flag of the game action data acquired by the game action data acquiring unit 92. If the game result flag indicates a success in clearing the game stage 10, the stage points associated with said game stage 10 will be identified in the stage storage 34, and its stage points will be added to the player's points in possession as the prize for winning against the designer. At the same time, the stage points are subtracted from the designer's points in possession as the penalty for the designer's loss to the player. If the game result flag indicates a failure in clearing the game stage 10, the stage points are similarly identified and its stage points will be subtracted from the player's points in possession as the penalty for the player's loss to the designer. At the same time, a predetermined amount of victory points is added to the designer's points in possession as the prize for winning against the player.

An operation of the game system 1000 structured as above will now be described hereinbelow.

Figure 9:
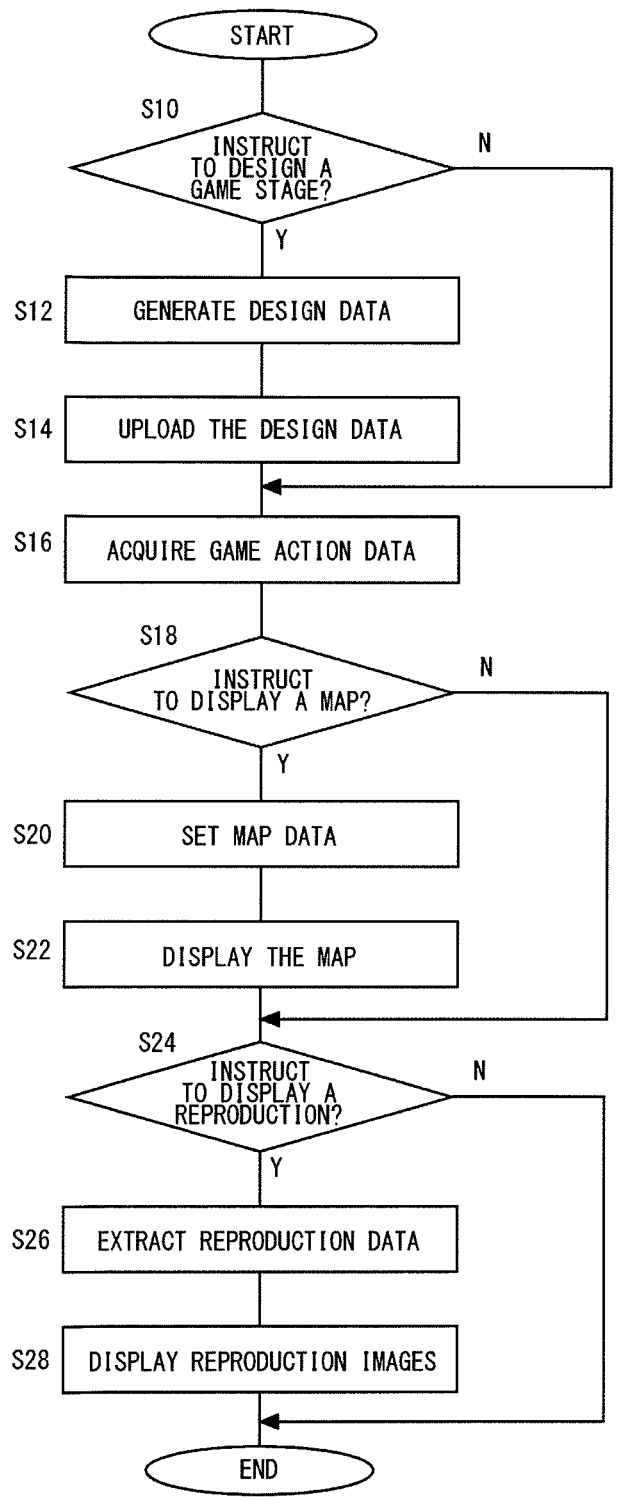
FIG. 9 is a flowchart showing an operation of a designer terminal according to a first embodiment of the present invention.

FIG. 9 is a flowchart showing an operation of the designer terminal 100 according to the first embodiment. As an instruction on the design of a game stage 10 is received from a designer (Y of S10), the stage setting unit 42 generates design data of the game stage 10 and records the generated design data thereof in the stage storage 34 (S12). As an instruction on the release of the design data from the designer, the design date are uploaded into the management server 200 and disclosed to the players (S14). If no instruction on the design of a game stage 10 is given from the designer (N of S10), Steps S12 and S14 will be skipped.

A player terminal 300, which has acquired the design data on the game stage 10 from the management server 200, records a player's game action for the game stage 10 as game action data and then uploads the game action data into the management server 200. The game action data acquiring unit 46 acquires the game action data from the management server 200 and records the acquired game action data in the game action data storage 36 (S16). The designer specifies the ID of a specific game stage 10 and requests the display of a map for the game stage 10. As an instruction on the display of a map is detected (Y of S18), the map setting unit 50 sets map data of the game stage 10 where the movement path of a player's character 16 is drawn, according to the design data and the game action data (S20). The map setting unit 50 has the display device display the map data via the display control unit 22 (S22). If no instruction on the display of a map is given (N of S18), Steps S20 and S22 will be skipped.

The designer specifies the ID of the specific game stage 10 or specifies a specific movement path on the map, and thereby requests a reproduction display of a game action by the player for the game stage 10. An instruction on the reproduction display thereof is detected (Y of S24), the game action reproducing unit 48 extracts reproduction data required for the reproduction display from the game action data according to a reproduction mode specified by the designer and then conveys the thus extracted reproduction data to the game action executing unit 64 (S26). The game action executing unit 64 has the display device display the reproduction images of the game action by the player, via the display control unit 22, based on the reproduction data (S28). If no instruction on the reproduction display thereof is not detected (N of S24), Steps S26 and S28 will be skipped.

By employing the first embodiment as described above, in the UGC a scheme is reliably achieved where the actual game actions taken by the players are checked by the designer. For example, the designer can verify the movement paths of the player's character 16, a success/failure in dodging the gimmicks 14 by the player's character 16, and so forth in the virtual space 12 where the designer places the gimmicks 14. As a result, the designer gets enhanced enjoyment of games. For example, the designer can verify the validity and suitability of types and placement positions of the gimmicks 14 placed, namely whether or not his/her decision is appropriate, based on feedbacks from the players. Also, the configuration of the game stages 10 can be brushed up based on the feedbacks from the players. In other words, the enjoyment of the game developer can be shared with the designer who is actually also a user of the game.

Also, by employing the first embodiment, the game actions taken by a player in the neighborhood of placement regions of the gimmicks 14 are displayed as the player's reproduction images. The reproduction images that the designer wishes to check in particular are the game actions taken by the player in the placement regions of the gimmicks 14. The first embodiment enables the designer to check the reproduction images for a short time, namely, it enables him/her to check them efficiently, and thereby further enhances the enjoyment of the designer.

Also, by employing the first embodiment, the game actions which are taken by a player in the neighborhood of the placement regions of gimmicks 14 and which has failed to clear the game stage 10 due to the gimmicks 14 are displayed as the reproduction images. It naturally appears that the enjoyment of the designer gets further enhanced if the player fails to clear the game stage 10, namely, if the designer wins against the player. The first embodiment enables the designer to check and examine efficiently the reproduction images of the failure in clearing a game stage 10, and thereby further enhances the enjoyment of the designer.

Furthermore, by employing the first embodiment, displayed are a map of a game stage 10 where the gimmicks 14 of the game stage 10 and the game actions taken by the player's character 16 are drawn. As a result, the designer can check the game actions taken by the player in more efficient manner, and thereby the designer can get enhanced enjoyment. For example, of gimmicks 14 placed between the starting point and the finishing point, the designer can check which gimmick 14 is struggled for by a number of players. Also, the designer can check which type of gimmicks 14 or a gimmick 14 placed in which position is effective to defeat the players. Also, the existence of any movement paths that the designer has not assumed at first as the movement path for the player's character 16 can be verified.

Furthermore, by employing the first embodiment, points in possession of the designer and those in possession of the players vary according to the game action results played by the players. Since a player can gain his/her points when he/she succeeds to clear the game stage 10, incentives to play the game stage 10 are created among the players who play the game. As a result, many game action data are likely to be presented to the designer from the users, which in turn enhances the designer's enjoyment. Also, if a great number of gimmicks 14 with higher levels of difficulty are placed in order to design a game stage 10 having a higher level of difficulty, the stage points will increase and higher points will be paid to the player when the stage is cleared. This requires ingenuous efforts on the designer's part to select gimmicks 14 and set the placement positions wisely, thus further enhancing the enjoyment of the designer.

(Second Embodiment)

In the game system 1000 according to the first embodiment, the reproduction data for game actions are extracted by the player terminals 300, and the map data are set by the player terminals 300 also. That is, the extraction of such data and the setting of the map data are done by user's local terminals. In a game system 1000 according to a second embodiment, the management server 200 carries out these processings. As a result, the processing load in the designer terminal 100 is reduced and the system resource required by the designer terminal 100 is reduced. Note that the structural components of the game system 1000 according the second embodiment are the same as those of the game system 1000 shown in FIG. 2. Hereinbelow, the description of the same components and the like as those of the first embodiment will be omitted.

The provision of the game action data acquiring unit 46 is not needed in the functional components of the designer terminal 100 and the player terminals 300. The game action reproducing unit 48 acquires data for reproduction from the management server 200 instead of extracting them by itself. The map setting unit 50 acquires the map data from the management server 200 instead of setting them by itself. A detailed description will be given hereinbelow.

The game action reproducing unit 48 acquires the reproduction data from the management server 200 using the ID of a game stage 10 specified by the designer as a key. As will be discussed later, the thus acquired reproduction data are set by the management server 200 in accordance with a format specified by the designer. Hence, whenever a passage of elapsed time recorded in the reproduction data is detected, the game action reproducing unit 48 conveys an operation input associated with the elapsed time recorded in the reproduction data or the operation input and the operation position to be reproduced, to the game action executing unit 64 independent of the reproduction mode. After this, the game action executing unit 64 has the display device display the reproduction data according to the reproduction mode specified by the designer in a similar manner to the first embodiment.

As for the game stage 10 specified by the designer, the map setting data 50 acquires, from the management server 200, map data where the gimmicks 14 placed in the specified game stage 10 and the game actions taken by the player's character 16 are drawn. Then the map setting data 50 has the display device display the thus acquired map data via the display control unit 22.

Figure 10:
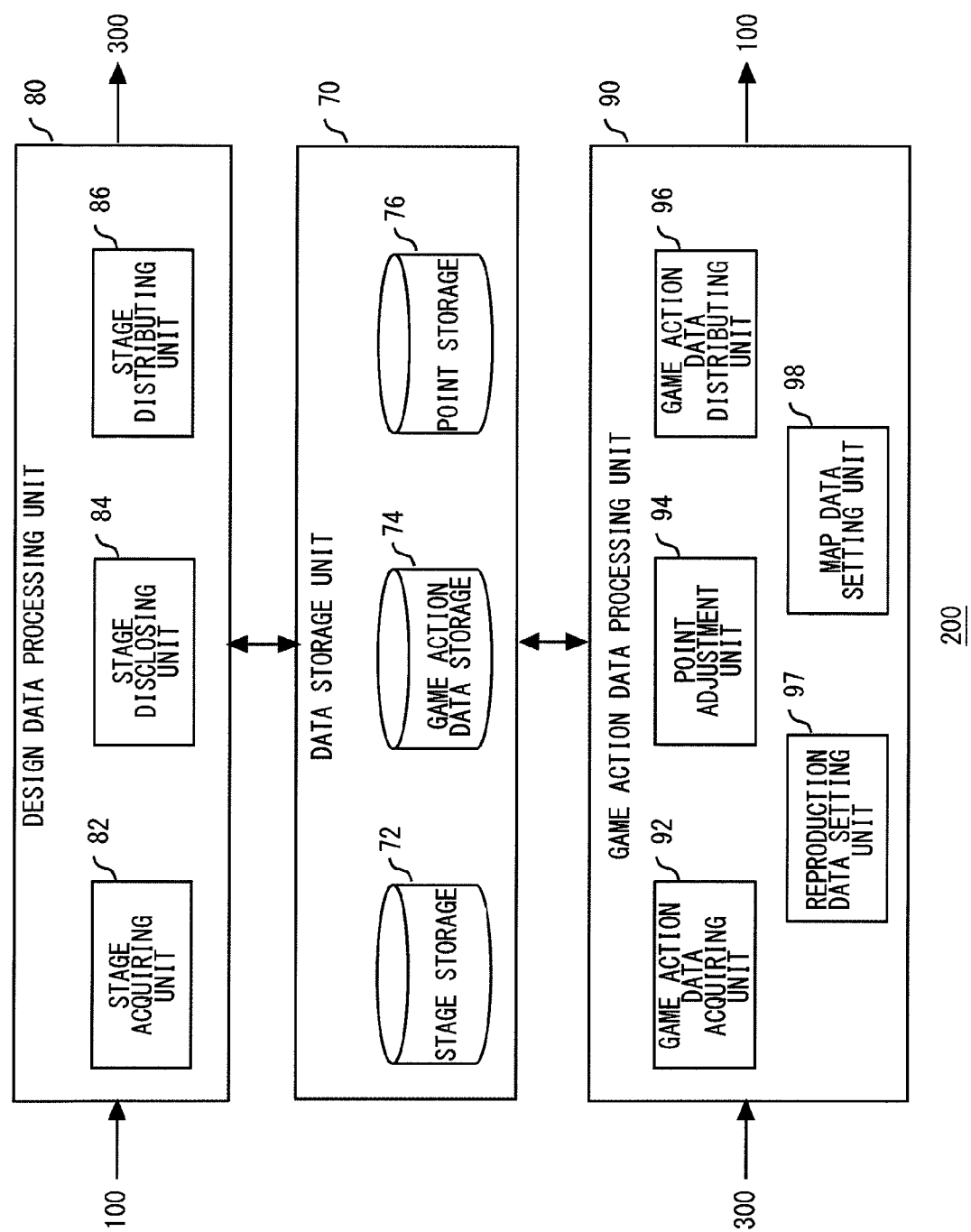
FIG. 10 is a block diagram showing functional components of a management server according to a second embodiment of the present invention.

A description is now given of functional components of the management server 200. FIG. 10 is a block diagram showing the functional components of the management server 200 according to the second embodiment. The game action data processing unit 90 further includes a reproduction data setting unit 97 and a map data setting unit 98.

The reproduction data setting unit 97 performs the processing which is carried out by the game action reproducing unit 48 of the designer terminal 100 in the first embodiment, and sets reproduction data used for a reproduction display on the designer terminal 100. The game action data distributing unit 96 sends the reproduction data set by the reproduction data setting unit 97 to the designer terminal 100 so as to display the reproduction images on the display device of the designer terminal 100.

Specifically, as the reproduction data setting unit 97 receives a request for the acquisition of the ID of a game stage 10 and the reproduction data whose reproduction mode has been specified, from the game action reproducing unit 48 of the designer terminal 100, it acquires the game action data associated with the ID thereof from the game action data storage 74. If the first reproduction mode is specified on the request of the acquisition of the reproduction data, the reproduction data setting unit 97 will extract directly the elapsed time and the operation inputs recorded in the game action data as the reproduction data.

If the second reproduction mode is specified on the request of the acquisition of the reproduction data, the reproduction data setting unit 97 will identify the positions of gimmicks recorded in the design data on the game stage 10 specified by the acquisition request, by referencing the stage storage 72. Then, out of the operation positions recorded in the game action data, the reproduction data setting unit 97 identifies the operation position whose difference from the identified gimmick position is within a predetermined range, as the operation position to be reproduced. The reproduction data setting unit 97 extracts the operation position to be reproduced and the elapsed time and operation inputs associated with the operation position to be reproduced, from the game action data as the data for reproduction.

If the third reproduction mode is specified on the request of the acquisition of the reproduction data, the reproduction data setting unit 97 will first determine whether the game result flag is set for a failure in clearing or not. Game action data having the game result flag set for a success in clearing is excluded from the subsequent processing. Then the reproduction data setting unit 97 identifies the positions of gimmicks recorded in the design data on the game stage 10 specified by the acquisition request, by referencing the stage storage 72. Then, out of the operation positions recorded in the game action data, the reproduction data setting unit 97 further identifies the operation position whose difference from the identified gimmick position is within a predetermined range and which is also recorded in the last portion of the time series, as the operation position to be reproduced. Where a plurality of operations are recorded in the neighborhood of a gimmick 14 having caused a failure in clearing, the reproduction data setting unit 97 identifies the operation positions corresponding to the plurality of operations as the operation positions to be reproduced. The subsequent processing is similar to that performed when the second reproduction mode is specified, and the data for reproduction are extracted from the game action data based on the operation positions to be reproduced.

The map data setting unit 98 performs the processing which is carried out by the map setting unit 50 of the designer terminal 100 in the first embodiment, and sets map data used for a map display on the designer's terminal 100. The game action data distributing unit 96 sends the reproduction data set by the map data setting unit 98 to the designer terminal 100 so as to display the map of the game stage 10 on the display device of the designer terminal 100.

Specifically, the map data setting unit 98 receives a request for the acquisition of map data in which the ID of a game stage 10 is identified. Similar to the map setting unit 50 in the first embodiment, the map data setting unit 98 sets data on the virtual space 12 where gimmicks 14 are placed, according to the design data and gimmick data on the specified game stage 10, by referencing the stage storage 72. Next, the map setting unit 98 acquires the game action data associated with the game stage 10 from the game action data storage 74, identifies a movement path of the player's character 16 according to the operation inputs recorded in the game action data, and sets the data indicating the movement path in the data on the virtual space 12. Next, the map setting unit 98 generates a set of map data representing a predetermined type of map, such as shown in FIG. 7, from the data on the virtual space 12 in which the gimmicks 14 and the movement path of the player's character 16 are already set.

As it is detected by the input detector 20 that a specific moving image is selected by the designer from among the movement paths shown on the map, the game action reproducing unit 48 of the designer terminal 100 acquires the reproduction data of a game action on the selected movement path from the management server 200. Then the game action reproducing unit 48 displays the reproduction images of the game action on the selected movement on the display device. At this time, the reproduction data setting unit 97 acquires game action data, from which the movement paths specified by the game action reproducing unit 48 are generated, from the game action data storage 74. The reproduction data setting unit 97 extracts the data for reproduction from the game action data and transmits the extracted reproduction data to the game action reproducing unit 48.

The game action reproducing unit 48 may display the reproduction images of game actions in such a manner that the game actions are limited to those played after a position is selected by the designer. In such a case, the game action reproducing unit 48 further conveys the selected position of a movement path to the reproduction data setting unit 97 of the management server 200. The reproducing data setting unit 97 identifies an operation input associated with the position selected by the designer, from the game action data, extracts the reproduction data from the game action data which are to be used after said operation input, and transmits the extracted reproduction data to the game action reproducing unit 48.

Figure 11:
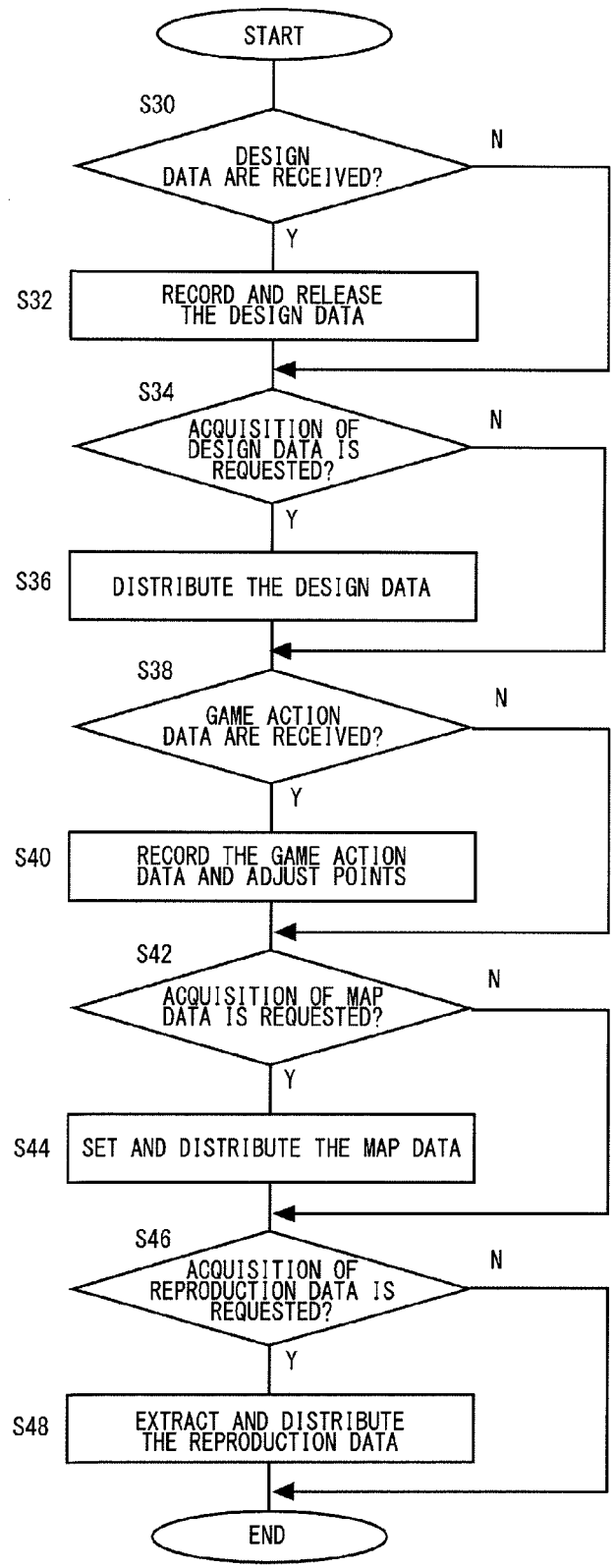
FIG. 11 is a flowchart showing an operation of a management server according to a second embodiment of the present invention.

FIG. 11 is a flowchart showing an operation of the management server 100 according to the second embodiment. As the stage acquiring unit 82 receives the design data on the game stage 10 from the designer terminal 100 (Y of S30), it records the design data in the stage storage 72. At the same time, the stage disclosing unit 84 discloses the design data to the player terminals 300 (S32). As a request for the acquisition of the disclosed design data is received from a player terminal 300 (Y of S34), the stage distributing unit 86 acquires the design data, the acquisition of which has been requested, from the stage storage 72 and distributes the acquired design data to the player terminal 300 (S36). If the design data are not received from the designer terminal 100 (N of S30), Step S32 will be skipped. If no request for the acquisition of the design data is made from the player terminals 300 (N of S34), Step S36 will be skipped.

As the game action data acquiring unit 92 receives the game action data on the game stage 10 from a player terminal 300 (Y of S38), it records the game action data in the game action storage 74. At the same time, the point adjustment unit 94 updates the contents of the point storage 76 in order to adjust the points possessed by the designer and the points possessed by the players according to the success or failure in clearing the game stage 10 (S40). If no game action data are received from the player terminal 300 (N of S38), Step S40 will be skipped.

As a request for the acquisition of map data is received from the design terminal 100 (Y of S42), the map data setting unit 98 sets the map data in which the movement path of the player's character 16 is drawn, and the game action data distributing unit 96 delivers the map data to the designer terminal 100 and has the designer terminal 100 display the map data (S44). As a request for reproduction data in which the ID of a specific game stage 10 or a specific movement path is specified on a map is received from the designer terminal 100 (Y of S46), the reproduction data setting unit 97 extracts the reproduction data from the game action data according to the reproduction mode specified through the acquisition request. The game action data distributing unit 96 delivers the reproduction data to the designer terminal 100 and has the designer terminal 100 display the reproduction images of the reproduction data (S48). If no request for the acquisition of map data is received (N of S42), Step S44 will be skipped. If no request for the acquisition of reproduction data is received (N of S46), Step 48 will be skipped.

Note that the operation of the management server 200 according to the first embodiment does not involve the processings of S42 to S48 shown in FIG. 11. Instead, when the request for the acquisition for game action data is received, the processing of delivering the game action data by the game action data distributing unit 96 to the designer terminal 100 is added.

The same advantageous effects as with the first embodiment are achieved in the game system 1000 according to the second embodiment. That is, in the UGC games, a scheme is realized where the actual game actions taken by the players are checked by the designer. As a result, the designer gets enhanced enjoyment of games.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

A description is now given of a first modification. In this first modification of the first embodiment, the game actions in a player terminal 300 are reproduced and displayed on the designer terminal 100 almost in real time. After a passage of a predetermined time interval such as one second, the game action data distributing unit 68 of the player terminal 300 acquires the game action data on a game stage 10, which is being played by a player, by referencing the contents of the game action data storage 36. The time interval during which the content of the game action data storage 36 is referenced is preferably within several seconds in order that the game action can be reproduced and displayed at the designer's side in close to real time. However, the time interval may be determined in consideration of intervals for a typical operation input, a processing load in each device or the communication network 400, or the like. Also, the time interval may be determined as appropriate based on the knowledge gained through business operation or experiments or the like using the game system 1000.

The game action data distributing unit 68 identifies elapsed time and operation inputs for the game action data, which are newly added after the contents thereof has been last referenced, as real game action data, and transmits them to the management server 200 whenever needed. The game action data acquiring unit 92 of the management server 200 acquires, as needed, the real game action data from the player terminal 300. And the game action data distributing unit 96 transmits, as needed, the real game action data to the player terminals 300. The designer terminal 100 acquires, as needed, the real game action data from the management server 200. And the game action reproducing unit 48 sets directly the contents of the real game action data as data for reproduction and displays, as needed, a game action state at the player terminal 300.

A description is now given of a second modification. In this second modification of the second embodiment, the game actions in a player terminal 300 are reproduced and displayed on the designer terminal 100 almost in real time. The structure of the player terminal 300 according to the second modification is the same as that of the first modification. The game action data acquiring unit 92 of the management server 200 acquires, as needed, the real game action data from the player terminal 300. And the reproduction data setting unit 97 sets directly the contents of the real game action data as data for reproduction, and the game action data distributing unit 96 transmits, as needed, the reproduction data to the player terminal 300. The game action data acquiring unit 46 of the designer terminal 100 acquires, as needed, the reproduction data from the management server 200, and the game action reproducing unit 48 displays, as needed, the game action state at the player terminal 300 based on the acquired reproduction data.

By employing the first or the second modification, the designer can check the game state at the player terminals 300 almost in real time, so that the designer can get enhanced enjoyment of games. Note that the extraction of the real game action data from the game action data may be done by the management server 200 or the designer terminal 100 in the first modification and the management server 200 in the second modification.

A description is now given of a third modification. In the first and second embodiments, the elapsed time, the operation inputs and the operation positions are contained in the game action data. In this third modification, the game action data may contain an elapsed time, a movement start position and vector information indicating the details of a movement. The movement start position is a position that exists prior to the start of movement by the player's character 16 and may be specific coordinates in the virtual space 12. The vector information is data that indicate the direction of movement of the player's character 16 and the magnitude of movement thereof. In this case, with a passage of elapsed time, the game action reproducing unit 48 of the player terminal 300 displays the reproduction of game actions in such a manner that the player's character 16 is initially displayed in the movement start position and is moved based on the vector information.

A description is now given of a fourth modification. In the first and second embodiments, the elapsed time, the operation inputs and the operation positions are contained in the game action data. In this fourth modification, the game action data may contain video data or a plurality of still image data. In such a case, when the reproduction display of a game action is requested, the game action reproducing unit 48 displays the video data recorded in the game action data or sequentially displays a plurality of still images so as to reproduce and display the game action.

A description is now given of a fifth modification. In the first and second embodiments, the structure of a designer terminal 100 is the same as that of each player terminal 300. In this fifth modification, the structure of designer terminal 100 may differ from that of each player terminal 300. In this case, the designer terminal 100 may have the data storage unit 30 and the design support unit 40 only, whereas the player terminal 300 may have the data storage unit 30 and the stage action unit 60 only.

A description is now given of a sixth modification. In the first and second embodiments, the design data and the game action data are sent and received between the designer terminal 100 and the player terminals 300 via the management server 200. In this sixth modification, various data may be directly sent and received between the designer terminal 100 and the player terminals 300 through peer-to-peer (P2P) communications. In this sixth modification, the management server 200 may provide various information used to match a designer terminal 100 with a proper player terminal 300 or match a given player terminal 300 with the designer terminal 300, namely, the various information used to support the P2P communications therebetween. For example, the management server 200 supplies the list information on designer terminals 100 capable of communicating with player terminals 300, namely, the list information on designer terminals 100 which are being connected to the communication network 400, to the player terminals 300. The list information may contain the name of a designer and the name and brief content of a game stage provided by the designer. When a specific designer terminal 100 is selected by the player terminals 300, the management server 200 supplies address information, on the player terminals 300, required for the connection to the selected designer terminal 100. The player terminals 300 establish P2P communications with the selected designer terminal 100 using the address information. By employing this sixth embodiment, the load of the management server 200 can be suppressed even if the number of designer terminals 100 and player terminals 300 increases. Thus, the sixth modification is especially suitable for a case where a large number of designers and players participate in this UGC game.

An arbitrary combination of any one of the above-described embodiments with any one of the above-described modifications is also available and effective as an embodiment of the present invention. A new embodiment arising from such a combination achieves not only advantageous effects of either one of the embodiments but also those of one of the modifications.

It is also understood by those skilled in the art that the function to be achieved by each constituent element described in Claim is realized by a single unit of each function block indicated in the present embodiments or in linkage with those units.

While the preferred embodiments of the present invention and the modifications thereof have been described using specific terms, such description is for illustrative purposes only, and it is to be understood that changes and variations may be further made without departing from the spirit or scope of the appended claims.

What is claimed is:

1. A game control program embedded in a non-transitory computer-readable medium, the program comprising:
   a design data acquiring module configured to acquire design data from a plurality of external terminals of a plurality of users, respectively, that has been designated among the plurality of users and selected from a plurality of items of design data presented as related to a virtual space of a game in which the plurality of users play;
   a play execution module configured to cause the virtual space in which users play, to be displayed, and to cause, when the design data is acquired by the design data acquisition module, the virtual space to be displayed in a mode determined by the design data;
   a play data recording module configured to record play data indicating a representation of a user's performance in the virtual space as displayed by the play execution module; and a play data provision module configured to allow a target external terminal among the plurality of external terminals to acquire target play data, the target external terminal being identified as a source of respective design data of a user's performance indicated in the target play data, wherein the target external terminal is determined by externally providing the target play data along with identification information identifying the respective design data for the virtual space subject to the target play data.

2. A game device comprising:

a design data acquisition unit configured to acquire design data from a plurality of external terminals of a plurality of users, respectively, that has been designated among the plurality of users and selected from a plurality of items of design data presented as related to a virtual space of a game in which the plurality of users play;

a play execution unit configured to cause the virtual space in which users play to be displayed, and to cause, when the design data is acquired by the design data acquisition unit, the virtual space to be displayed in a mode determined by the design data;

a play data recording unit configured to record play data indicating a representation of a user's performance in the virtual space as displayed by the play execution unit; and a play data provision unit configured to allow a target external terminal among the plurality of external terminals to acquire target play data, the target external terminal being identified as a source of respective design data of a user's performance indicated in the target play data, wherein the target external terminal is determined by externally providing the target play data along with identification information identifying the respective design data for the virtual space subject to the target play data.

3. A game control program embedded in a non-transitory computer-readable medium, the program comprising:

a design module configured to generate design data related to a virtual space from a plurality of external terminals of a plurality of users related to a virtual space of a game in which the plurality of users play, according to an instruction from a user;

a design data provision module configured to cause an external terminal of a user acquiring the design data to also acquire identification information identifying respective design data for the virtual space, by providing the design data to the plurality of external terminals along with the identification information;

wherein the terminal of a user that has acquired the design data provides play data, indicating a representation of a user's performance in the virtual space according to the design data, to a target external terminal among the plurality of external terminals that is identified as a source of respective design data of a user's performance indicated in the play data, the game control program further comprising:

a play data acquisition module configured to acquire, from an external device, play data indicating a representation of a user's performance in the virtual space according to the design data, by transmitting a request for providing the play data to the external device, designating the identification identifying the design data; and a play reproduction module configured to reproduce the representation of a user's performance in the target external terminal being identified as the source of respective design data of a user's performance indicated in the play data.

4. The game control program according to claim 3, wherein the terminal of a user that has acquired the design data sequentially provides play data indicating current content of a user's performance to an external device, while the user is playing the game in the virtual space, wherein the play data acquisition module sequentially acquires the play data indicating the current content of from an external device, and wherein the play reproduction module sequentially reproduces a representation of the current content of the user's performance in the terminal of the user that has acquired the design data by referring to the sequentially acquired play data.

5. A game device comprising:

a design unit configured to generate design data related to a virtual space, from a plurality of external terminals of a plurality of users related to a virtual space of a game in which the plurality of users play, according to an instruction from a user; and a design data provision unit configured to cause an external terminal of a user acquiring the design data to also acquire identification information identifying the respective design data for the virtual space by providing the design data to the plurality of external terminals along with the identification information;

wherein the terminal of a user that has acquired the design data provides play data, indicating a representation of a user's performancein in the virtual space according to the design data, to a target external terminal among the plurality of external terminals that is identified as a source of respective design data of a user's performance indicated in the play data, the game device further comprising:

a play data acquisition unit configured to acquire, from an external device, play data indicating a representation of a user's performance in the virtual space according to the design data, by transmitting a request for providing the play data to the external device, designating the identification identifying the design data; and a play reproduction unit configured to reproduce the representation of a user's performance in the target external terminal being identified as the source of respective design data by referring to the acquired play data.

6. A game system comprising:

a plurality of external terminals of a plurality of users, respectively who play a game in a virtual space, wherein one or more terminals among the plurality of external terminals may be indicated as design terminals, each of the design terminals comprising:

a design unit configured to generate design data related to a virtual space of a game in which the plurality of users play, according to an instruction from a design terminal; and a design data provision unit configured to provide design data to an external terminal along with identification information identifying respective design data for the virtual space, wherein the external terminal comprises:

a design data acquisition unit configured to acquire, from the one or more design terminals, design data designated and selected by a design terminal from a plurality of items of design data generated, along with the identification information identifying a source design terminal of the respective design data for the virtual space;

a play execution unit configured to cause the virtual space, in which users play a game, to be displayed, and to cause the virtual space to be displayed in a mode determined by the respective design data when the respective design data is acquired by the design data acquisition unit;

a play data recording unit configured to record play data indicating a representation of a user's performance in the virtual space displayed by the play execution unit; and a play data provision unit configured to provide said play data to an external terminal along with the respective identification information identifying a target design terminal identified as a source of the respective design data of a user's performance indicated in the play data wherein each of the design terminals further comprises:

a play data acquisition unit configured to acquire, from an external device, play data indicating a representation of a user's performance in the virtual space according to the design data generated by the terminal locally, by transmitting a request for providing the play data to the external device, designating the identification identifying the design data; and a play reproduction unit configured to reproduce the representation of a user's performance in the target design terminal being identified as the source of respective design data by referring to the acquired play data.

7. The game system according to claim 6, wherein an external terminal to which the design data was provided acquires address data for a design terminal providing the respective design data, wherein the design data acquisition unit of the external terminal acquires the design data designated according to the address data, directly from the design terminal providing the respective design data, and wherein the play data provision unit of the external terminal directly provides the play data to the target design terminal providing the respective design data, according to the address data.

\* \* \* \* \*